US009767672B2

(12) United States Patent
Thaker et al.

(10) Patent No.: US 9,767,672 B2
(45) Date of Patent: Sep. 19, 2017

(54) MOBILE DEVICE SELF-IDENTIFICATION SYSTEM

(71) Applicant: eBay Inc., San Jose, CA (US)

(72) Inventors: Nikhil Vijay Thaker, Round Rock, TX (US); Kamal Zamer, Austin, TX (US); Jeremiah Joseph Akin, Pleasant Hill, CA (US); Joseph Vernon Paulson, IV, Austin, TX (US); Praveen Nuthulapati, Austin, TX (US); Jayasree Mekala, Austin, TX (US)

(73) Assignee: eBay Inc., San Jose, CA (US)

( * ) Notice: Subject to any disclaimer, the term of this patent is extended or adjusted under 35 U.S.C. 154(b) by 50 days.

(21) Appl. No.: 13/918,661

(22) Filed: Jun. 14, 2013

(65) Prior Publication Data

US 2014/0368339 A1 Dec. 18, 2014

(51) Int. Cl.
*G08B 21/24* (2006.01)
*H04W 4/02* (2009.01)

(52) U.S. Cl.
CPC .................................... *G08B 21/24* (2013.01)

(58) Field of Classification Search
CPC .... G08B 21/02; G08B 21/0266; G08B 21/22; H04W 4/028; H04W 4/16; B63C 4/028; B63C 4/16; B63C 11/26; G06F 21/305; G06F 21/552; G08G 1/005; G08G 1/0969; G10L 15/183; H04M 1/72525
See application file for complete search history.

(56) References Cited

U.S. PATENT DOCUMENTS

| | | | | |
|---|---|---|---|---|
| 2001/0047265 | A1* | 11/2001 | Sepe, Jr. | 704/275 |
| 2004/0019259 | A1* | 1/2004 | Brown | A61B 5/0002 600/300 |
| 2004/0132447 | A1* | 7/2004 | Hirschfeld | H04M 1/6033 455/426.2 |
| 2006/0221769 | A1* | 10/2006 | Van Loenen et al. | 367/99 |
| 2008/0061993 | A1* | 3/2008 | Fong et al. | 340/573.4 |
| 2008/0274723 | A1* | 11/2008 | Hook | H04M 1/72566 455/419 |
| 2012/0258701 | A1* | 10/2012 | Walker | H04W 4/16 455/419 |

* cited by examiner

*Primary Examiner* — Brian Zimmerman
*Assistant Examiner* — Cal Eustaquio
(74) *Attorney, Agent, or Firm* — Schwegman Lundberg & Woessner, P.A.

(57) ABSTRACT

Techniques for locating and identifying mobile devices are described. According to various embodiments, an ambient sound signal may be detected using a microphone of a mobile device. Thereafter, it may be determined that the ambient sound signal corresponds to a predefined user query for assistance in locating the mobile device. For the, a predefined response sound corresponding to the predefined user query may be emitted, using a speaker of the mobile device.

17 Claims, 13 Drawing Sheets

400

| QUERY INFORMATION | |
|---|---|
| User query 1 | Response sound 1 |
| User query 2 | Response sound 2 |
| User query 3 | Response sound 3 |
| ... | ... |

*Fig. 4*

MOBILE DEVICE SELF-IDENTIFICATION SYSTEM

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright eBay, Inc. 2013, All Rights Reserved.

TECHNICAL FIELD

The present application relates generally to data processing systems and, in one specific example, to techniques for locating and identifying mobile devices.

BACKGROUND

The use of mobile devices, such as cellphones, smartphones, tablets, and laptop computers, has increased rapidly in recent years. In many cases, it is not uncommon for multiple mobile devices of the same model to be in the possession of different family members of the same family, or different employees of the same company, or different friends in a group of friends, and so on.

BRIEF DESCRIPTION OF THE DRAWINGS

Some embodiments are illustrated by way of example and not limitation in the figures of the accompanying drawings in which:

FIG. 4 illustrates an example of query information, according to various embodiments;

DETAILED DESCRIPTION

Figure 1:
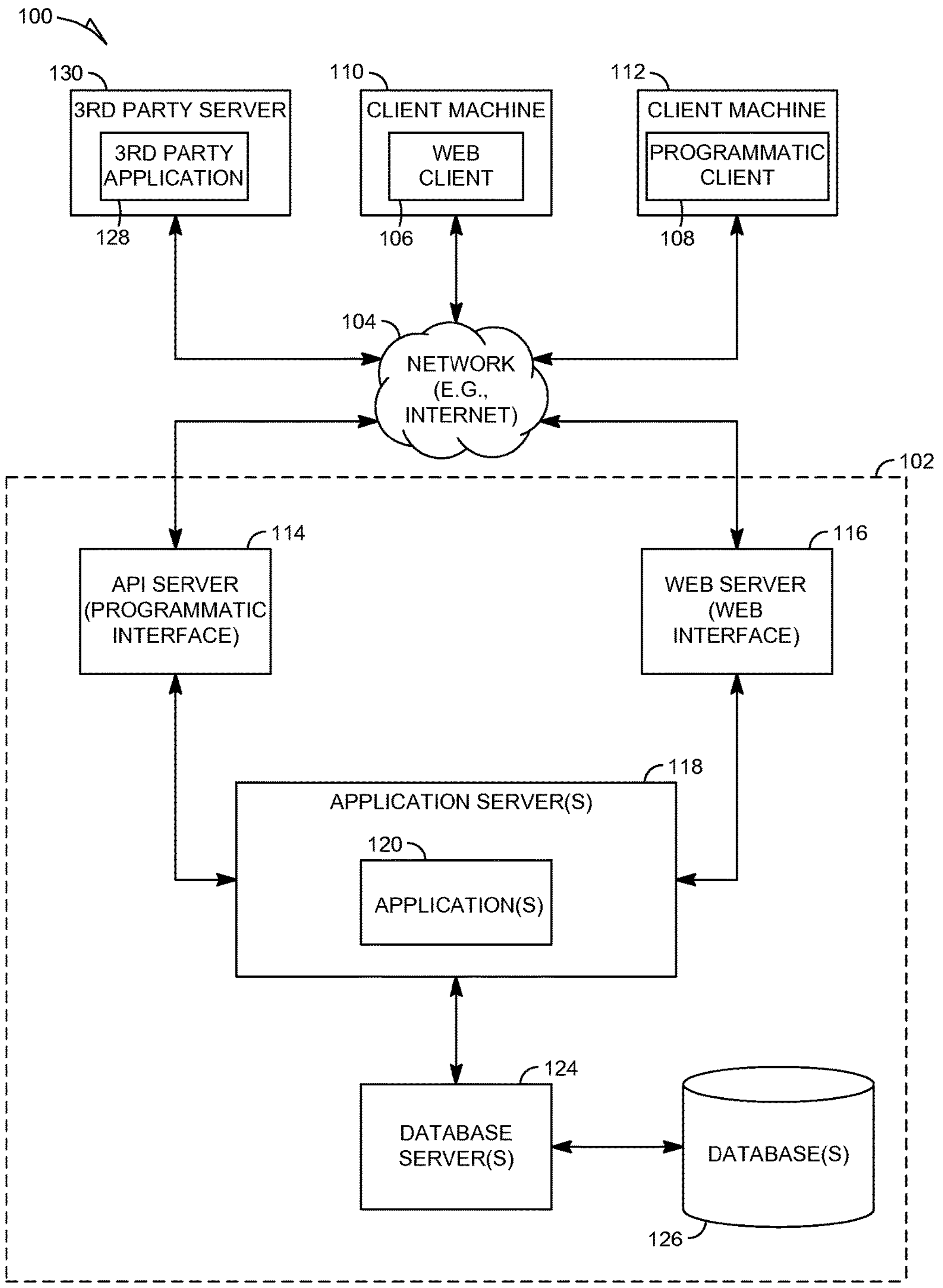
FIG. 1 is a network diagram depicting a client-server system, within which one example embodiment may be deployed.

Example methods and systems for locating and identifying mobile devices are described. In the following description, for purposes of explanation, numerous specific details are set forth in order to provide a thorough understanding of example embodiments. It will be evident, however, to one skilled in the art that the present invention may be practiced without these specific details.

According to various exemplary embodiments, a mobile device self-identification system is configured to enable a mobile device to identify itself and its current location, or to output information to assist users in identifying or locating the mobile device. For example, consistent with various embodiments, an ambient sound signal may be detected using a microphone of a mobile device. Thereafter, it may be determined that the ambient sound signal corresponds to a predefined user query for assistance in locating the mobile device, such as the user query “Where are you?”. A predefined response sound or phrase, such as the spoken phrase “Here I am”, may then be emitted via speaker of the mobile device.

Accordingly, a mobile device self-identification system enables a user to voice a simple predefined query and to receive a predefined response back from the mobile device. In some embodiments, the mobile device self-identification system may correspond to a mobile app installed on the mobile device that reacts to predefined user queries, such as the user query “Hey where are you?” In some embodiments, the mobile device self-identification system causes the phone to exit a vibrate or silent mode and enter into an interactive mode to answer the user query with a predefined response, such as a phrase, or the user’s name, or some sound clue, etc.

Accordingly, a mobile self-identification system described herein may assist a user in locating a mobile device. This may be advantageous in a case where the user has lost their phone and has no way to interact with the phone because it is set on a vibrate mode or a silent mode. For example, the user may try to call their phone, but may be unsuccessful if the phone is set to a vibrate mode because the user was in a meeting, for instance. As another example, the mobile device self-identification system may be advantageous in a case where a user is having trouble identifying their particular mobile device from a group of mobile devices, because the user’s household has several different mobile devices (e.g., smartphones and tablets). Accordingly, the user can voice a simple predefined query, and the user’s mobile device will respond back with a predefined answer.

According to various exemplary embodiments, a mobile device self-identification system may include a touch function that responds with a predefined sound when picked up. For example, when the mobile device is in a sleep mode and is picked up by someone, the mobile device may state the name of the owner. Accordingly, the mobile device self-identification system described herein enables a user to easily identify a mobile device. This may be particularly advantageous if, for example, they are a large number of similar mobile devices (e.g., smart phones and tablets) belonging to the user’s friends or family that are present in the user’s workplace or household. For example, if the user wishes to grab their smart phone where several available devices look similar, it may be hard for the user to identify their smart phone. Moreover, it is possible that the user’s family members or friends may accidentally pick up the user’s smart phone and leave the household with it. Accordingly, in various embodiments described herein, a phone that is in sleep mode may recognize a user touch and states the name of the phone’s registered user or owner.

FIG. 1 is a network diagram depicting a client-server system 100, within which one example embodiment may be deployed. A networked system 102 provides server-side functionality via a network 104 (e.g., the Internet or Wide Area Network (WAN)) to one or more clients. FIG. 1 illustrates, for example, a web client 106 (e.g., a browser), and a programmatic client 108 executing on respective client machines 110 and 112.

An Application Program Interface (API) server 114 and a web server 116 are coupled to, and provide programmatic and web interfaces respectively to, one or more application servers 118. The application servers 118 host one or more applications 120. The application servers 118 are, in turn, shown to be coupled to one or more databases servers 124 that facilitate access to one or more databases 126. According to various exemplary embodiments, the applications 120 may be implemented on or executed by one or more of the modules of the system 200 illustrated in FIG. 2. While the applications 120 are shown in FIG. 1 to form part of the networked system 102, it will be appreciated that, in alternative embodiments, the applications 120 may form part of a service that is separate and distinct from the networked system 102.

Further, while the system 100 shown in FIG. 1 employs a client-server architecture, the present invention is of course not limited to such an architecture, and could equally well find application in a distributed, or peer-to-peer, architecture system, for example. The various applications 120 could also be implemented as standalone software programs, which do not necessarily have networking capabilities.

The web client 106 accesses the various applications 120 via the web interface supported by the web server 116. Similarly, the programmatic client 108 accesses the various services and functions provided by the applications 120 via the programmatic interface provided by the API server 114.

FIG. 1 also illustrates a third party application 128, executing on a third party server machine 130, as having programmatic access to the networked system 102 via the programmatic interface provided by the API server 114. For example, the third party application 128 may, utilizing information retrieved from the networked system 102, support one or more features or functions on a website hosted by the third party. The third party website may, for example, provide one or more functions that are supported by the relevant applications of the networked system 102.

Figure 2:
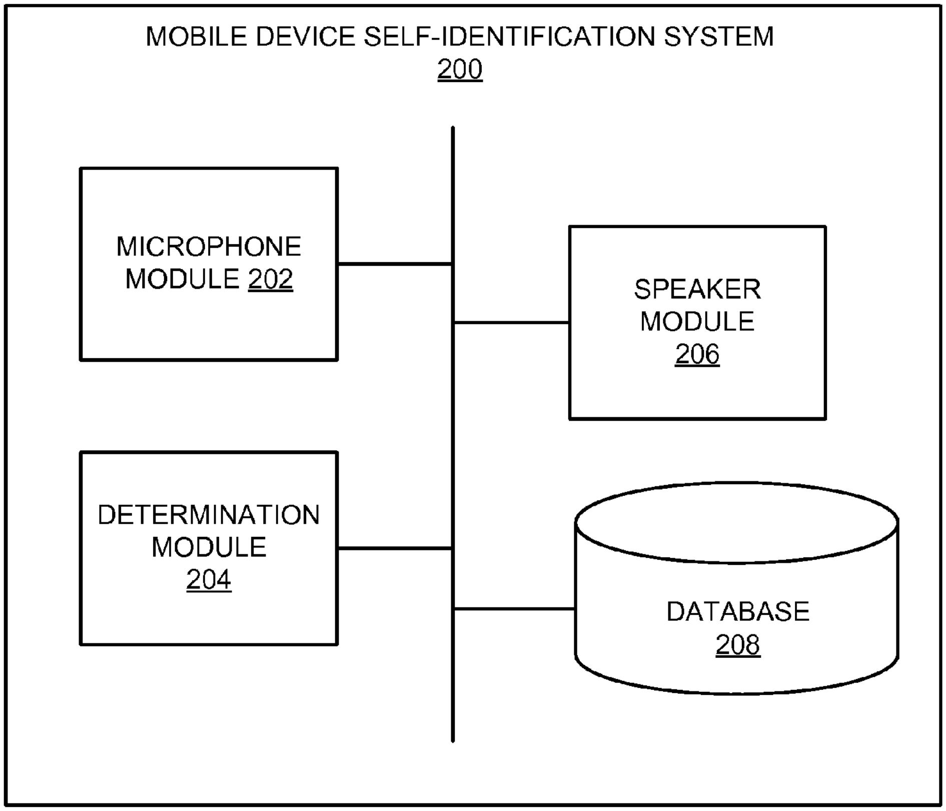
FIG. 2 is a block diagram of an example system, according to various embodiments.

Turning now to FIG. 2, a mobile device self-identification system 200 includes a microphone module 202, a determination module 204, a speaker module 206, and a database 208. The modules of the mobile device self-identification system 200 may be implemented on or executed by a single device such as a mobile device, or on separate devices interconnected via a network. The aforementioned mobile device may be, for example, one of the client machines (e.g. 110, 112) or application server(s) 118 illustrated in FIG. 1. The operation of each of the aforementioned modules of the mobile device self-identification system 200 will now be described in greater detail.

According to various embodiments, the microphone module 202 is configured to detect ambient sounds and noises near the device. For example, the microphone module 202 may detect words spoken by a speaker, such as the words "Where are you?". Thereafter, the determination module 204 is configured to determine that the ambient sound signal (e.g., the spoken phrase "Where are you?") corresponds to a predefined user query for assistance in locating the mobile device. Thereafter, the speaker module 206 is configured to emit a predefined response sound corresponding to the predefined user query. For example, the speaker module 202 may emit a predefined response sound such as the phrase "Here I am!".

Figure 3:
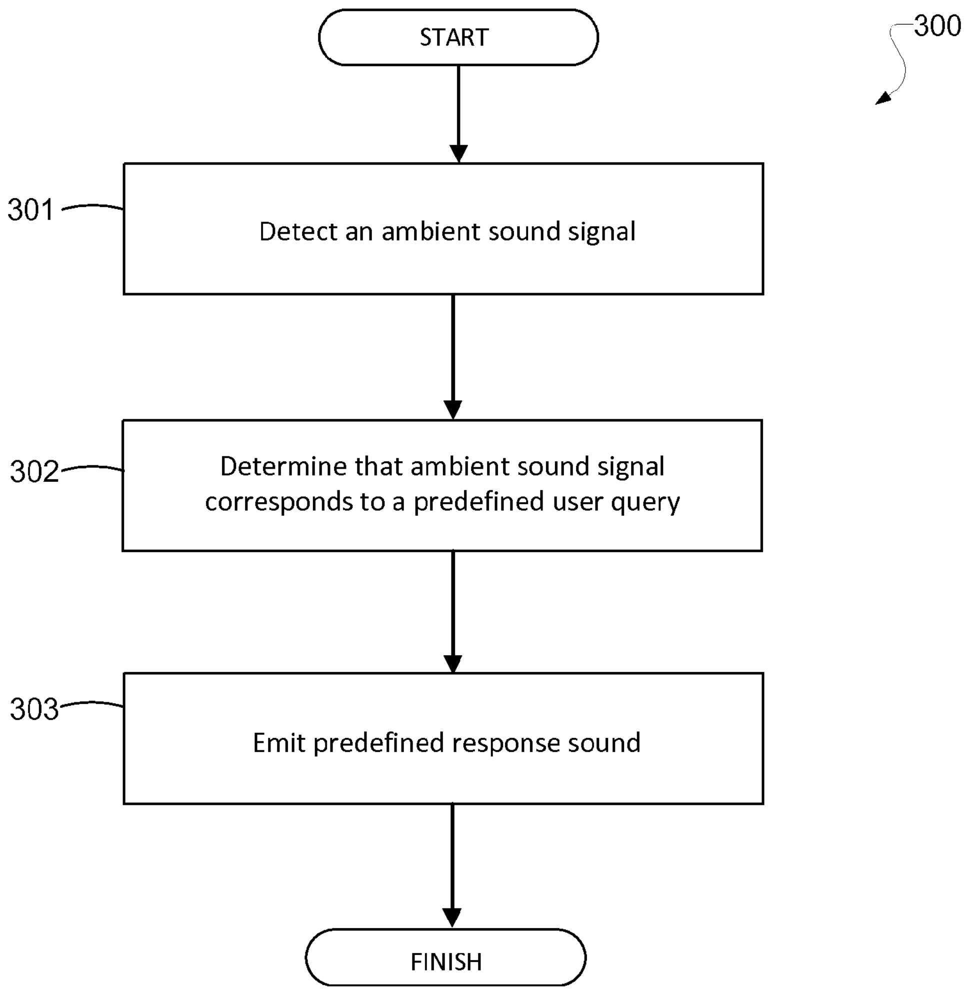
FIG. 3 is a flowchart illustrating an example method, according to various embodiments.

FIG. 3 is a flowchart illustrating an example method 300, according to various exemplary embodiments. The method 300 may be performed at least in part by, for example, the mobile device self-identification system 200 illustrated in FIG. 2 (or an apparatus having similar modules, such as client machines 110 and 112 or application server 118 illustrated in FIG. 1). In operation 301, the microphone module 202 detects an ambient sound signal proximate to a mobile device. In other words, the microphone 202 detects background noises, background sounds, ambient noises, or ambient sounds near the mobile device. For example, the microphone module 202 may detect words spoken by a speaker, such as the words "Where are you?". The aforementioned mobile device may correspond to, for example, a smartphone, cell phone, laptop computer, notebook computer, tablet computing device, etc. Accordingly, the microphone module 202 may correspond to a conventional microphone installed on the mobile device that is configured to detect sounds, as understood by those skilled in the art.

In operation 302, the determination module 204 determines that the ambient sound signal (e.g., the phrase "Where are you?") matches or corresponds to a predefined user query for assistance in locating the mobile device. For example, the determination module 204 may access query information that identifies various user queries. For example, FIG. 4 illustrates exemplary query information 400 that identifies various user queries for assistance in locating a mobile device (e.g., user query 1, user query 2, user query 3, etc.), and for each of the user queries, a corresponding response sound (e.g., response sound 1, response sound 2, response sound 3, etc.). Examples of user queries for assistance in locating a mobile device may include, for example, "where are you?", "Help me find you", "I can't find you", "where are you hiding?", "Tell me where you are", and so on. It is understood that the aforementioned examples of user queries are non-limiting, and a user query may correspond to any phrase or sound, which may be referenced in the query information 400. Examples of response sounds include bells, alarms, sirens, beeps, ring tones, phrases (e.g., "here I am", "I'm over here", "you're getting closer", etc.), and so on. It is understood that the aforementioned examples of response sounds are non-limiting, and a response sound may correspond to any phrase or sound, which may be referenced in the query information 400. In some embodiments, the query information 400 may include links or pointers to audio samples or sound files (e.g., Wave files or MPEG Layer-3 files) of the user queries or response sounds. The user query information 400 may be stored locally at, for example, the database 208 illustrated in FIG. 2, or may be stored remotely at a database, data repository, storage server, etc., that is accessible by the mobile device self-identification system 200 via a network (e.g., the Internet). Accordingly, after the determination module 204 accesses the query information 400, the determination module 204 may compare the ambient sound signal detected in operation 301 with each of the predefined user queries included in the query information 400, in order to detect if the ambient sound signal matches or corresponds to one of the predefined user queries.

In operation 303, the speaker module 206 emits a predefined response sound (e.g., "Here I am") corresponding to the predefined user query (e.g., "Where are you?"). For example, suppose that the ambient sound signal detected in operation 301 (e.g., the phrase "Where are you?") corresponds to the user query 2 (e.g., an audio file of the phrase "Where are you?") in the aforementioned query information 400 that identifies various response sounds associated with the various user queries. Accordingly, the determination module 204 may identify, in the query information 400, the particular response sound (e.g., response sound 2) that corresponds to the particular user query (e.g., user query 2) that was detected in operation 301. The 204 may cause the speaker module 206 to emit the corresponding response sound (e.g., respond sound 2), which may be a phrase such as, for example, "Here I am". The speaker module 206 may correspond to a conventional audio speaker installed on the mobile device that is configured to emit audio sounds, as understood by those skilled in the art.

Figure 5:
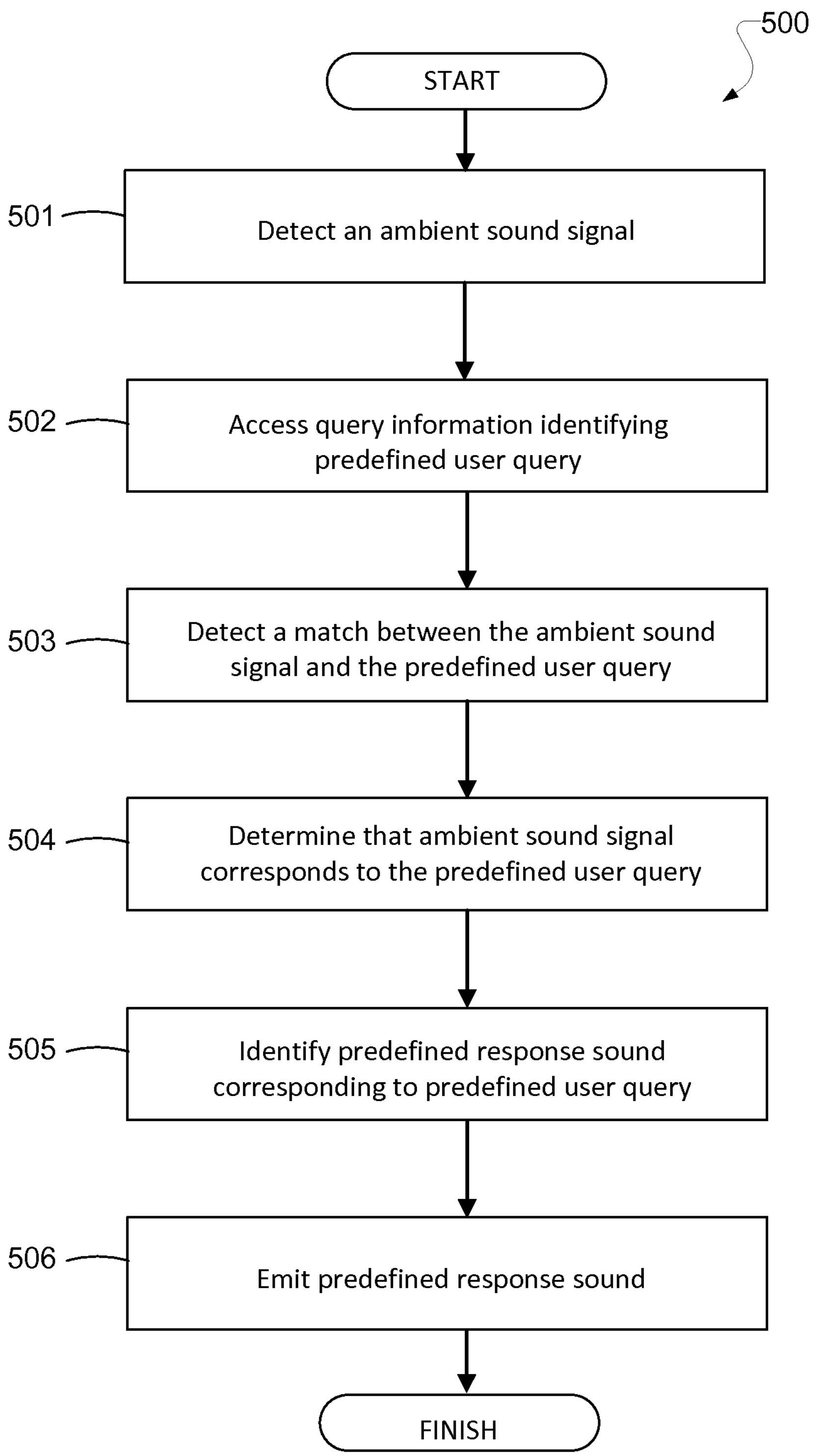
FIG. 5 is a flowchart illustrating an example method, according to various embodiments.

FIG. 5 is a flowchart illustrating an example method 500, describing the method 300 in FIG. 3 in more detail. The method 500 may be performed at least in part by, for example, the mobile device self-identification system 200 illustrated in FIG. 2 (or an apparatus having similar modules, such as client machines 110 and 112 or application server 118 illustrated in FIG. 1). In operation 501, the microphone module 202 detects an ambient sound signal proximate to a mobile device. In operation 502, the determination module 204 accesses query information identifying various predefined user queries for assistance in locating a mobile device. For example, FIG. 4 illustrates exemplary query information 400 identifying links to sound files of various predefined user queries for assistance in locating a mobile device. In operation 503, the determination module 204 detects a match or correspondence between the ambient sound signal detected in operation 501 and one of the predefined user queries in the query information accessed in operation 502 (e.g., user query 2 included in the query information 400 illustrated in FIG. 4). In operation 504, the determination module 204 determines that the ambient sound signal corresponds to the appropriate predefined user query for assistance in locating the mobile device, based on the match or correspondence detected in operation 503. In operation 505, the determination module 204 identifies a predefined response sound corresponding to the predefined user query that was determined in operation 504. In operation 506, the speaker module 206 emits the predefined response sound that was identified in operation 505.

While various embodiments throughout refer to a "match" between an ambient sound signal and a predefined user query, it is not necessary for the determination module 204 to detect an absolute or exact match between the ambient sound signal and the predefined user query, in order for the determination module 204 to determine that the ambient sound signal corresponds to or matches the predefined user query. For example, operation 503 may comprise detecting that the ambient sound signal closely matches the predefined user query, or detecting that the ambient sound signal and the predefined user query are similar or have similar aural characteristics, or determining that the extent or degree of similarity between the ambient sound signal and the predefined user query is greater than a predetermined threshold, and so on.

According to various exemplary embodiments, the microphone module 202 may detect the ambient sound signal (e.g., the phrase "Where are you?") while the mobile devices operating in an active mode (e.g., when the display screen is active, when an incoming text message is being received, when an incoming phone call is being received, etc.). As described throughout, an active mode may refer to a state where the mobile device is turned on, and/or the display screen of the mobile device is activated and is displaying content, and/or the mobile device is performing some process or function, such as processing an incoming phone call or incoming text message.

Typically, when a user is unable to find a mobile device, the user has not utilized the mobile device for some period of time (typically at least a few minutes). However, when mobile devices and other electronic devices have not been utilized for at least a predetermined period of time (typically at least a few minutes), the mobile device may enter sleep mode, a hibernate mode, a standby mode, an inactive mode, etc. Accordingly, when the user searches for the mobile device and the user states a predefined user query (e.g., "Where are you?)", the mobile device will typically be operating in one of the aforementioned modes.

Accordingly, in various exemplary embodiments, the microphone module 202 may detect the ambient sound signal (e.g., the phrase "Where are you?") when a mobile device is not operating in an active mode. For example, in some embodiments, the microphone module 202 may detect the ambient sound signal (e.g., the phrase "Where are you?") after the mobile device begins operating in a sleep mode, a hibernate mode, a standby mode, an inactive mode, or another mode that is distinct from an active mode. As described throughout, a sleep mode, hibernate mode, standby mode, inactive mode, etc., refers to a low power mode for electronic devices such as computers, televisions, and remote controlled devices, while such devices are not in use, as understood by those skilled in the art. These modes save significantly on electrical consumption compared to leaving a device fully on and, upon resume, allow the user to avoid having to reissue instructions or to wait for a machine to reboot. For example, in computers, entering a sleep state is roughly equivalent to "pausing" the state of the machine. When restored, the operation continues from the same point, having the same applications and files open.

Similarly, according to various exemplary embodiments, the microphone module 202 may detect the ambient sound signal (e.g., the phrase "Where are you?") after the mobile device begins operating in a silent mode, low-volume mode (e.g., when the device volume is set to below a predetermined threshold), or a vibrate mode. Accordingly, the mobile device self-identification system 200 may assist the user with locating the mobile device by outputting the appropriate response sound, even if the mobile device is set to a silent mode or a vibrate mode.

Figure 6:
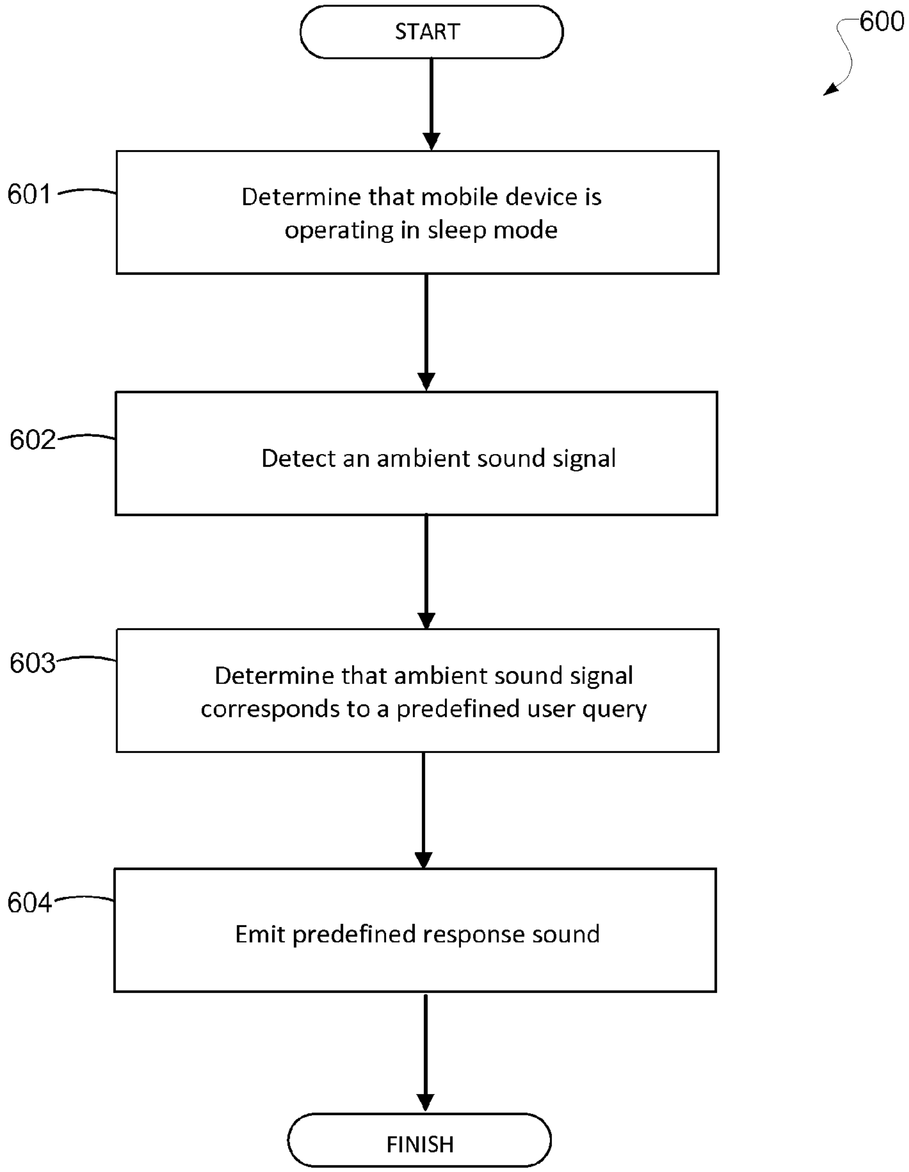
FIG. 6 is a flowchart illustrating an example method, according to various embodiments.

FIG. 6 is a flowchart illustrating an example method 600, consistent with various embodiments described above. The method 600 may be performed at least in part by, for example, the mobile device self-identification system 200 illustrated in FIG. 2 (or an apparatus having similar modules, such as client machines 110 and 112 or application server 118 illustrated in FIG. 1). In operation 601, the determination module 204 determines that a mobile device is operating in a sleep mode or has entered a sleep mode, a hibernate mode, a standby mode, an inactive mode, a silent mode, low-volume mode (e.g., when the device volume is set to below a predetermined threshold), or a vibrate mode. For example, when a mobile device enters one of the aforementioned modes, an electronic signal or electronic data flag signifying this event may be transmitted to the determination module 204 or may be stored in a data structure for access at a later time by the determination module 204. Operations 602-604 are substantially similar to operations 301-303 in the method 300 (see FIG. 3), and will not be described in further detail.

As described in various exemplary embodiments above, the user query information 400 identifies various user queries and corresponding response sounds. According to various exemplary embodiments, the user queries and the corresponding response sounds may be programmed or predefined by a user (e.g., a user of a mobile device) and stored in the user query information 400 based on user instructions. For example, in some embodiments, the mobile device self-identification system 200 may display a user interface on a mobile device that enables a user to request that a user query be programmed into the mobile device (e.g., to potentially help the user in locating the mobile device when the user cannot find the mobile device). After the user submits a request to store a user query, the interface displayed by the mobile device self-identification system 200 may enable the user to enter the user query, such as by typing the text of the words of the user query, or by orally stating the user query (which may be detected by a microphone of a mobile device and recorded in a sound file identified in the query information 400). Thereafter, the mobile device self-identification system 200 may permit the user to specify a response sound or phrase associated with this user query, such as by allowing the user to type in the text of words of a response phrase, or to orally state the response sound or phrase (which may be detected by a microphone of the mobile device and recorded in a sound file), or to select from sample response sounds or phrases, and so on. Thereafter, the determination module 204 may store the received user-specified query and the received user-specified response sound in association with each other in a database (in the query information 400 in FIG. 4, for example). Accordingly, when the mobile device self-identification system 200 detects this user query in the future, the mobile device self-identification system 200 will emit the corresponding response sound, as described in various embodiments above.

Figure 7:
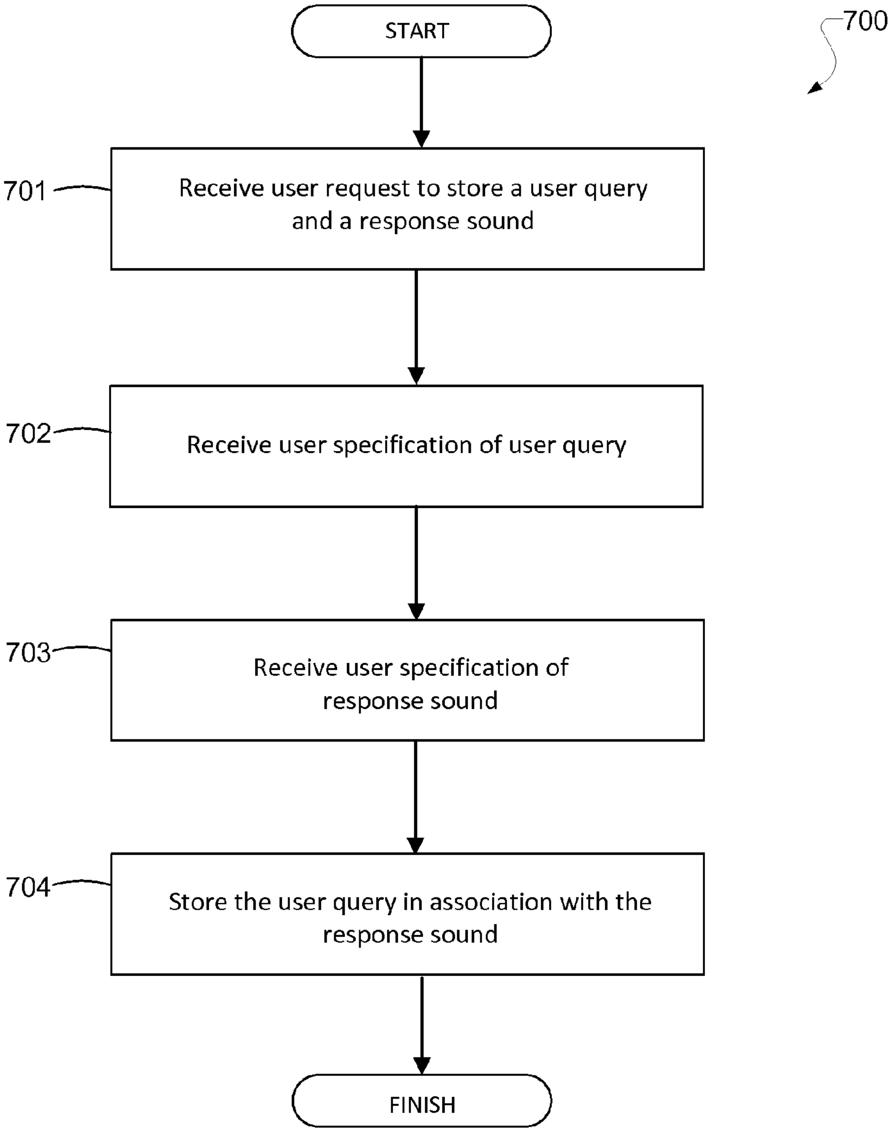
FIG. 7 is a flowchart illustrating an example method, according to various embodiments.

FIG. 7 is a flowchart illustrating an example method 700, consistent with various embodiments described above. The method 700 may be performed at least in part by, for example, the mobile device self-identification system 200 illustrated in FIG. 2 (or an apparatus having similar modules, such as client machines 110 and 112 or application server 118 illustrated in FIG. 1). In operation 701, the determination module 204 receives a user request to store a new user query and a new response sound corresponding to the new user query. In operation 702, the determination module 204 receives a user specification of the new user query. In operation 703, the determination module 204 receives a user specification of the new response sound. In operation 704, the determination module 204 stores the new user query in association with the new response sound (in query information 400 in FIG. 4, for example).

According to various exemplary embodiments, after the mobile device self-identification system 200 detects an ambient sound signal corresponding to a predefined user query (as described in various embodiments above), the mobile device self-identification system 200 may identify a speaker that stated the user query and determine that the speaker is an authorized user of the mobile device, before the mobile device self-identification system 200 emits the predefined response sound. This may be advantageous because unauthorized users may exploit the mobile device self-identification system 200 in order to find and use a mobile device (and perhaps even take or steal a mobile device) without permission of an authorized user or owner of the mobile device. Accordingly, when the mobile device self-identification system 200 detects a predefined user query (e.g., "Where are you?)", the mobile device self-identification system 200 may identify a speaker that stated the user query, such as by performing any speaker recognition process on detected ambient sounds as understood by those skilled in the art. Once the speaker is identified, the determination module 204 may determine whether the speaker is an authorized user of the mobile device by, for example, accessing registered user information identifying registered users of the mobile device. The registered user information may be stored locally at, for example, the database 208 illustrated in FIG. 2, or may be stored remotely at a database, data repository, storage server, etc., that is accessible by the mobile device self-identification system 200 via a network (e.g., the Internet). If the speaker is an authorized user of the mobile device, then the determination module 204 may cause the speaker module 206 to emit the predefined response sound corresponding to the predefined the user query, as described in various embodiments above. On the other hand, if the speaker is not an authorized user of the mobile device, then the determination module 204 will not cause the speaker module 206 to emit the predefined response sound.

Figure 8:
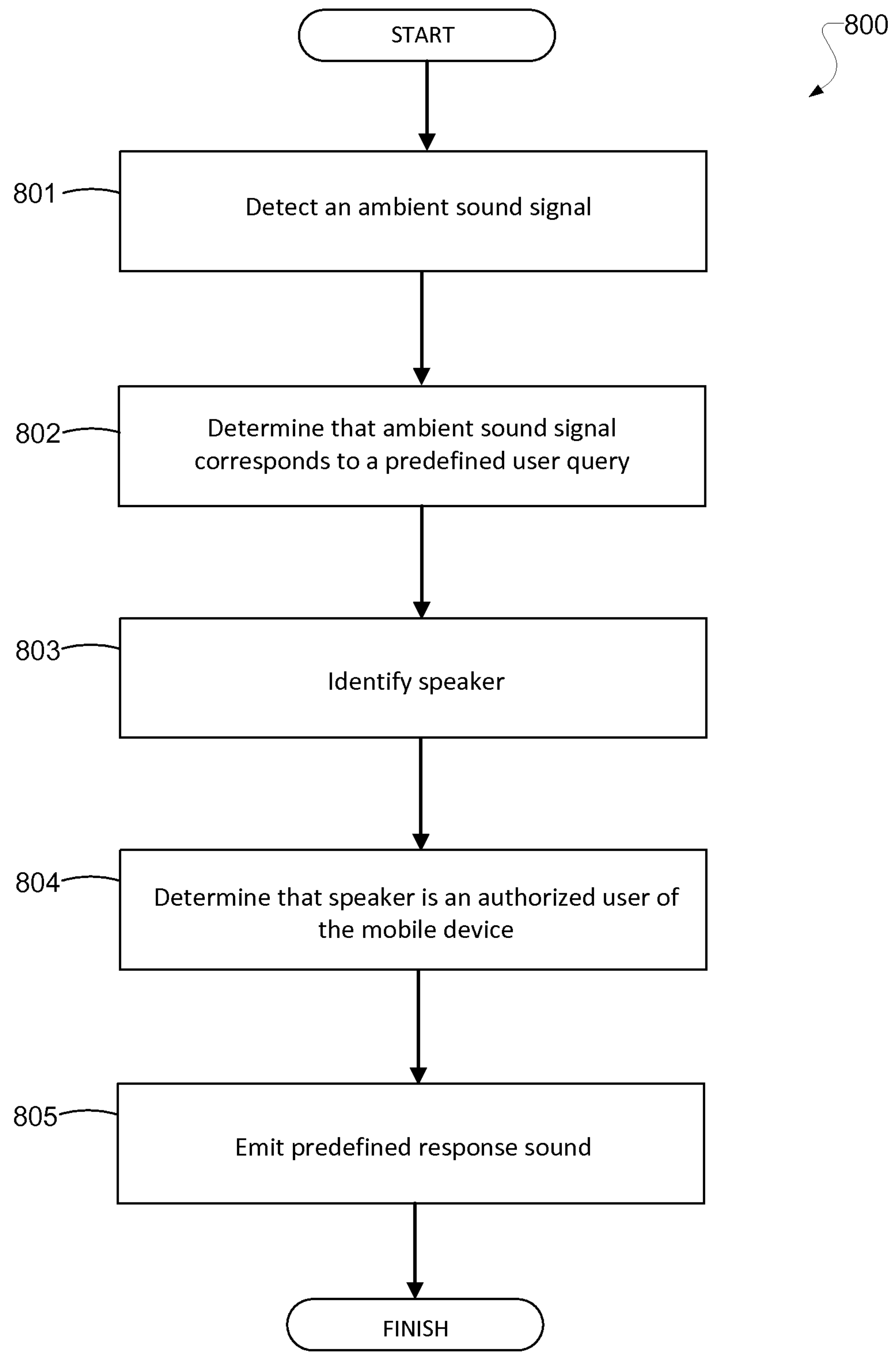
FIG. 8 is a flowchart illustrating an example method, according to various embodiments.

FIG. 8 is a flowchart illustrating an example method 800, consistent with various embodiments described above. The method 800 may be performed at least in part by, for example, the mobile device self-identification system 200 illustrated in FIG. 2 (or an apparatus having similar modules, such as client machines 110 and 112 or application server 118 illustrated in FIG. 1). In operation 801, the microphone module 202 detects an ambient sound signal proximate to a mobile device. In operation 802, the determination module 204 determines that the ambient sound signal corresponds to the appropriate predefined user query for assistance in locating the mobile device. In operation 803, the determination module 204 identifies speaker that is a source of the predefined user query. For example, the determination module 204 may perform any speaker identification process known to those skilled in the art upon the ambient sound signal detected in operation 801. In operation 804, the determination module 204 determines that the speaker identified in operation 803 is an authorized user of the mobile device. For example, the determination module 204 may access registered user information for the mobile device and determine that the speaker is identified as a registered user or owner of the mobile device. In operation 805, the speaker module 206 emits the predefined response sound corresponding to the predefined user query.

According to various exemplary embodiments, the mobile device self-identification system 200 may also determine that the predefined query is a bona fide request originating from an authorized user (e.g., friends or family of the phone's owner), by detecting a mobile device of a speaker (e.g., friends or family of the phone's owner) that stated the predefined query. For example, before or after the microphone module 202 detects the ambient sound signal, the determination module 204 may detect that another mobile device is located within a predetermined distance of a mobile device that is missing. For example, the second mobile device may belong to a friend or family member of the owner of the missing mobile device. The determination module 204 may detect the location of the second mobile device using any method known by those skilled in the art. For example, in some embodiments, hardware or software (e.g., a mobile application) installed on the second mobile device may be configured to transmit a current location of the second mobile device to a nearby devices (e.g., via a wireless communication protocol/standard such as the Bluetooth protocol or the near field communications (NFC) protocol). As another example, the second mobile device may be configured to transmit a current location to a server (e.g., a server of a telecommunications carrier associated with the second mobile device), and the missing mobile device may communicate with the server to access the current location of the second mobile device from the server.

After the determination module 204 detects the location of the second mobile device, the determination module 204 may determine that the predefined user query originated from an operator of the second mobile device. In some embodiments, the determination module 204 may make this determination by default (e.g., when no other mobile devices are detected nearby). In some embodiments, the determination module 204 may make this determination by identifying the speaker that stated the user query, using various techniques described elsewhere in this disclosure, and confirming that the speaker is a registered user of the second mobile device (e.g., by accessing registered order information associated with the second mobile device from the second mobile device or server). Further, the determination module 204 may determine that the operator of the second mobile device is an authorized user of the missing mobile device (e.g., a friend or family member of the owner), such as by accessing registered user information associated with the missing mobile device. The determination module 204 may then cause the speaker module 206 to emit the appropriate response sound. On the other hand, if the determination module 204 cannot confirm that the user query came from a registered or authorized user of the missing mobile device, the determination module 204 will not instruct the speaker module 206 to emit the appropriate response sound.

Figure 9:
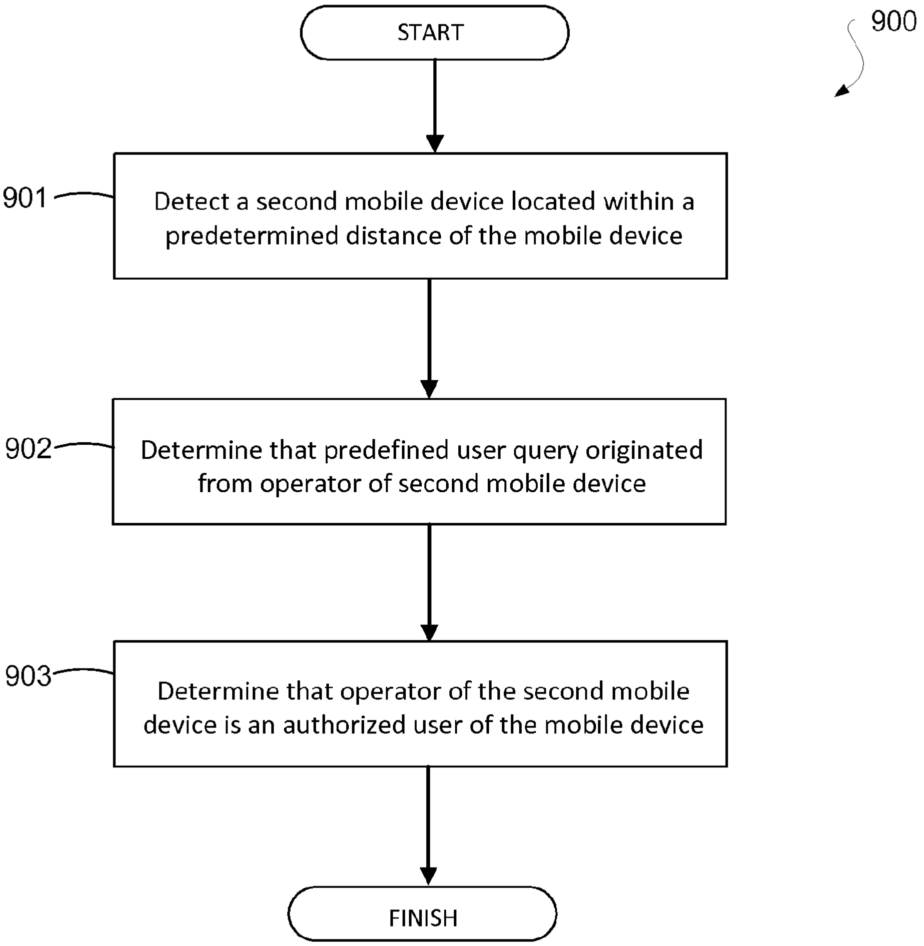
FIG. 9 is a flowchart illustrating an example method, according to various embodiments.

FIG. 9 is a flowchart illustrating an example method 900, consistent with various embodiments described above. The method 900 may occur between, for example, the operations 302 and 303 in the method 300 illustrated in FIG. 3. The method 900 may be performed at least in part by, for example, the mobile device self-identification system 200 illustrated in FIG. 2 (or an apparatus having similar modules, such as client machines 110 and 112 or application server 118 illustrated in FIG. 1). In operation 901, the determination module 204 detects a second mobile device located within a predetermined distance of the mobile device. In operation 902, the determination module 204 determines that the ambient sound signal (e.g., detected in operation 301) originated from an operator of the second mobile device. In operation 903, the determination module 204 determines that the operator of the second mobile device is an authorized user of the mobile device.

Figure 10:
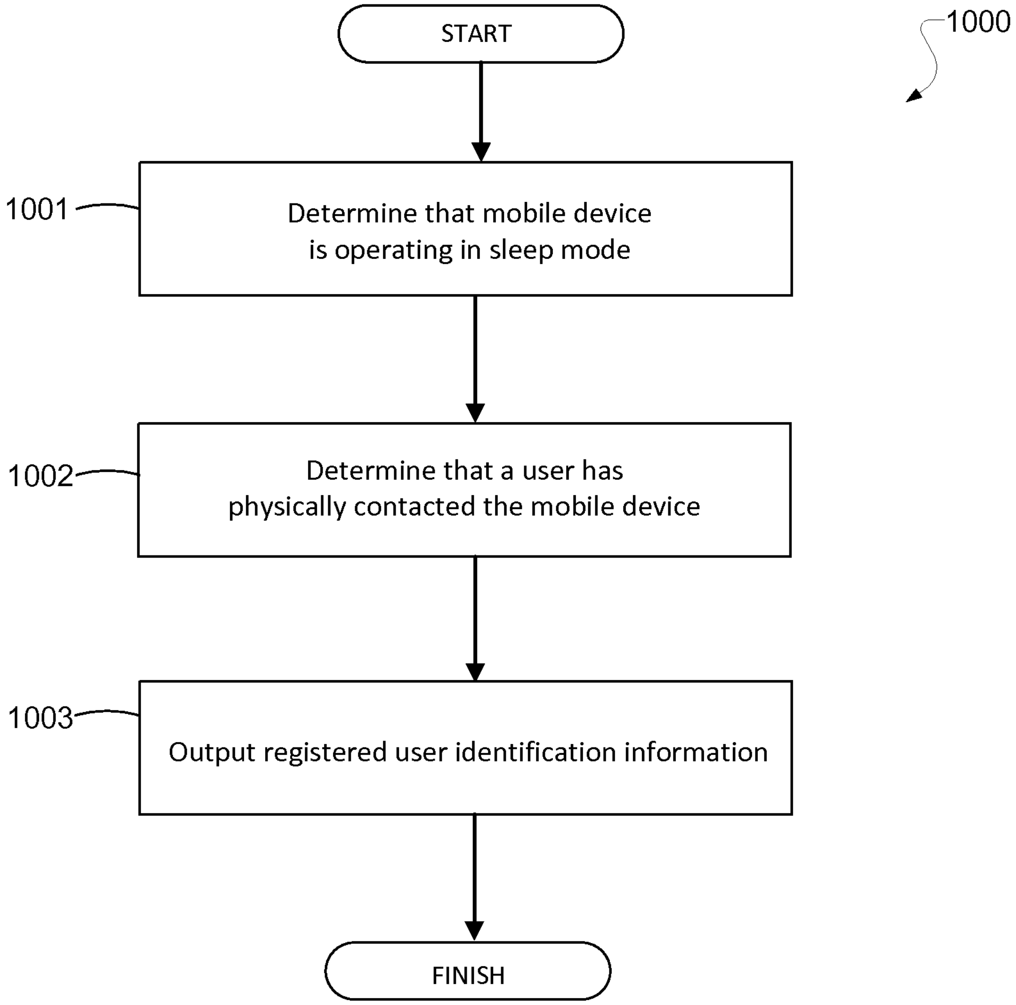
FIG. 10 is a flowchart illustrating an example method, according to various embodiments.

Turning now to FIG. 10, another exemplary embodiment is described. In particular, in some embodiments, whenever a mobile device is operating in a sleep mode, hibernate mode, active mode, etc., and a user touches the mobile device, the mobile device is configured to emit a self-identification response sound that identifies the owner of the mobile device. An example of a self-identification response sound is the phrase "This is John Smith's phone".

For example, according to various embodiments, the determination module 204 is configured to determine that a mobile device is operating in a sleep mode. Thereafter, the determination module 204 is configured to determine that a user has physically contacted the mobile device while the mobile device is in sleep mode. For example, if a user touches a touchscreen of the mobile device, the touchscreen may detect this user contact, and the determination module 204 may determine that a user has physically contacted the mobile device. As another example, if the user touches or picks up the mobile device causing it to be moved, an accelerometer or gyroscope included in the mobile device may be configured to detect this movement, and the determination module 204 may determine that a user has physically contacted the mobile device. As another example, if the user touches the mobile device, sound may be caused by the user touch, and a microphone of a mobile device may detect this sound, and the determination module 204 may determine that a user has physically contacted the mobile device. As another example, if the user comes close enough to the mobile device to touch it, a camera of the mobile device (e.g., a front facing camera or a rear facing camera) may detect or capture an image of the user (e.g., a face of the user), and the determination module 204 may determine that a user has physically contacted the mobile device. As another example, if a user comes close enough to the mobile device to touch it, a motion detection sensor of the mobile device (e.g., gesture recognition system) may detect or capture the movement of the user, and the determination module 204 may determine that a user has physically contacted the mobile device.

After the determination module 204 determines that the user has physically contacted the mobile device while the device is in sleep mode, the determination module 204 is configured to output registered user identification information identifying a registered user of the mobile device. For example, the registered user identification information may include a name of the registered user. In some embodiments, the determination module 204 may cause the speaker module 206 to emit a recorded phrase corresponding to the registered user identification information identifying the registered user of the mobile device. In some embodiments, the determination module 204 may cause the display screen of the mobile device to display the registered user identification information identifying the registered user of the mobile device.

FIG. 10 is a flowchart illustrating an example method 1000, consistent with various embodiments described above. The method 1000 may be performed at least in part by, for example, the mobile device self-identification system 200 illustrated in FIG. 2 (or an apparatus having similar modules, such as client machines 110 and 112 or application server 118 illustrated in FIG. 1). In operation 1001, the determination module 204 determines that a mobile device is operating in a sleep mode (or a silent mode, a vibrate mode, a hibernate mode, a standby mode, or an inactive mode). In operation 1002, the determination module 204 determines that user has physically contacted the mobile device while the mobile device is in the sleep mode. In operation 1003, the determination module 204 outputs registered user identification information identifying a registered user of the mobile device.

Figure 11:
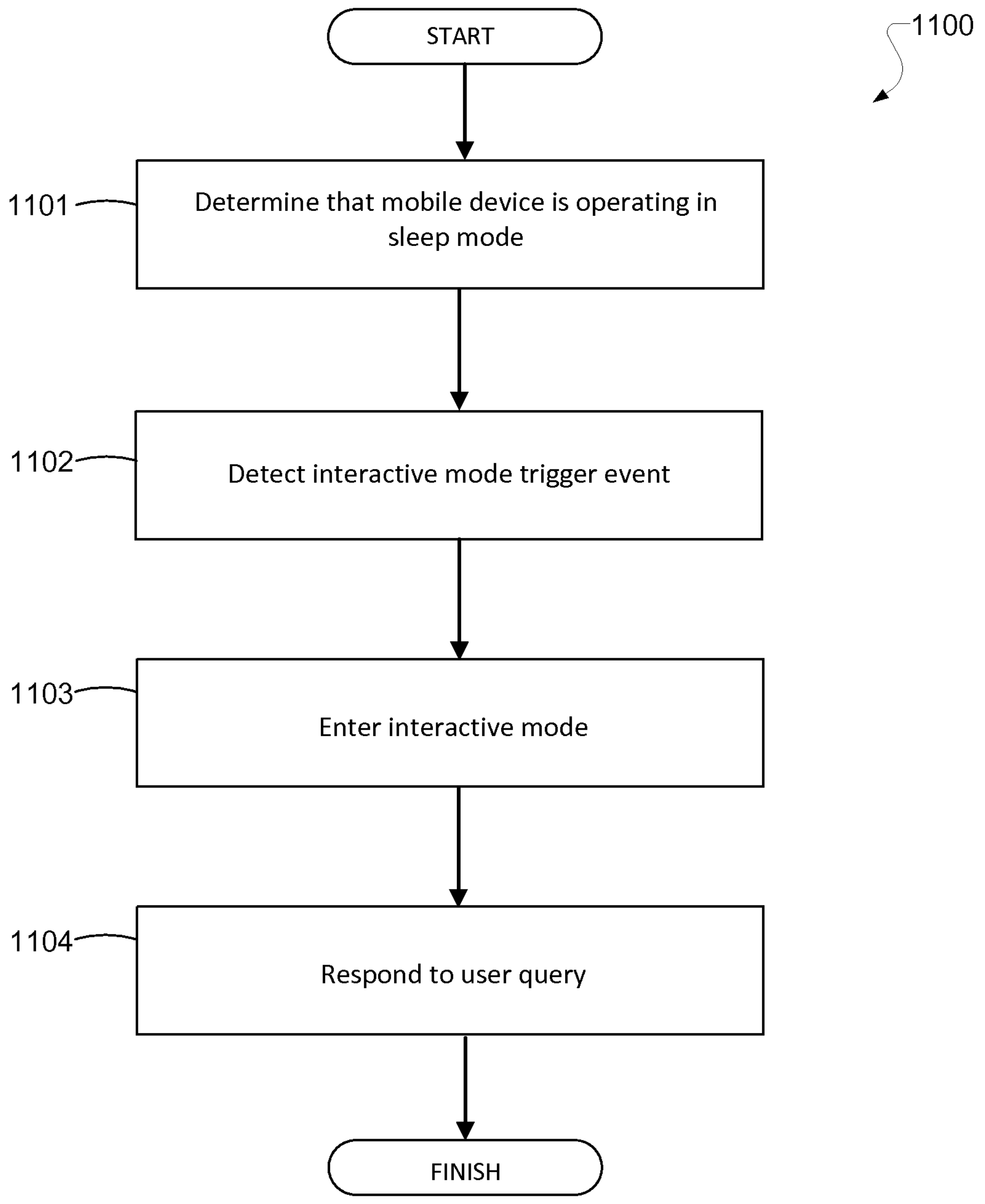
FIG. 11 is a flowchart illustrating an example method, according to various embodiments.

Turning now to FIG. 11, another exemplary embodiment is described. As understood by those skilled in the art, conventional mobile devices typically operate in one of various modes including an active mode, a sleep mode, an airplane mode, and so on. Consistent with various embodiments, a mobile device may be configured to enter into—and operate in—a specific type of mode known as an "interactive mode", which may be distinct from other modes including the various aforementioned modes.

For example, according to various exemplary embodiments, after a device is already operating in a sleep mode (or a silent mode, a vibrate mode, a hibernate mode, a standby mode, or an inactive mode), the mobile device self-identification system 200 may cause the device to enter into an interactive mode if a user touches the device or if the user states a predefined user query, as described in various embodiments above. Once in the interactive mode, the mobile device may answer various user queries such as a predefined user query for assistance in locating the mobile device (e.g., "Where are you?"), or other type of queries such as "What time is it?", "What is the weather like today?", "What are my appointments today?", and so on, based on information stored on the mobile device or information accessed from the Internet. While the mobile device operates in the interactive mode, it is not necessary for the user to manually operate the mobile device, such as by unlocking the mobile device or selecting commands displayed on the touch screen of the mobile device. While the mobile device operates in the interactive mode, it is not required for the display screen of the mobile device to be activated. Accordingly, the interactive mode described herein enables a user to interact in a frictionless manner with their mobile device in order to obtain desired information.

FIG. 11 is a flowchart illustrating an example method 1100, consistent with various embodiments described above. The method 1100 may be performed at least in part by, for example, the mobile device self-identification system 200 illustrated in FIG. 2 (or an apparatus having similar modules, such as client machines 110 and 112 or application server 118 illustrated in FIG. 1). In operation 1101, the determination module 204 determines that a mobile devices operating in the sleep mode (or a silent mode, a vibrate mode, a hibernate mode, a standby mode, or an inactive mode). In operation 1102, the determination module 204 detects a trigger event for causing the mobile device to exit the sleep mode and enter into an interactive mode. For example, the aforementioned trigger event may be a determination by the determination module 204 that a user has physically contacted the mobile device. As another example, the aforementioned trigger event may be the detection of a predefined user query. In operation 1103, the determination module 204 causes the mobile device to enter an interactive mode. In operation 1104, the determination module 204 responds to various user queries detected by the microphone module 202 (e.g., the query received in operation 1102, or other queries).

Example Mobile Device

Figure 12:
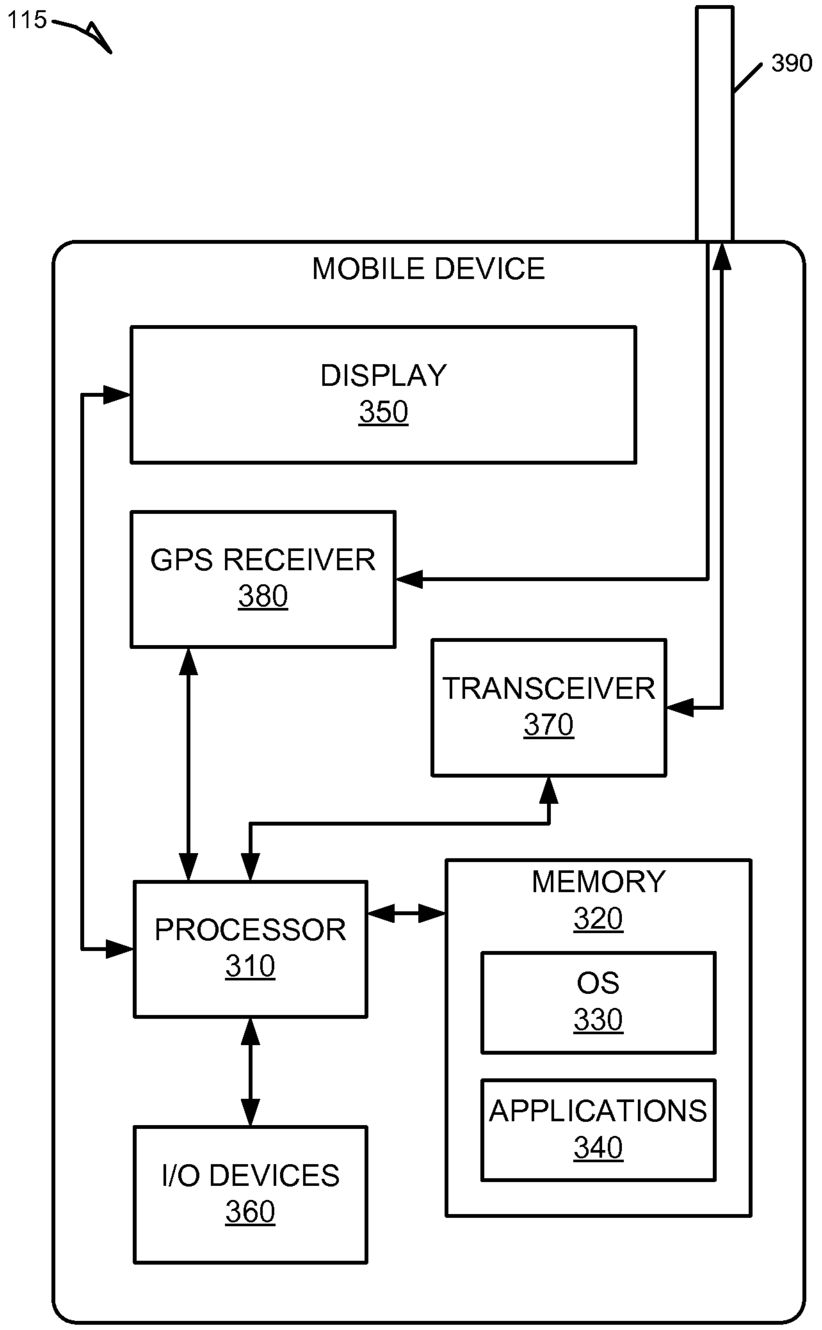
FIG. 12 illustrates an example of a mobile device, according to various embodiments.

FIG. 12 is a block diagram illustrating a mobile device 115, according to an example embodiment. The mobile device 115 may include a processor 310. The processor 310 may be any of a variety of different types of commercially available processors suitable for mobile devices (for example, an XScale architecture microprocessor, a Microprocessor without Interlocked Pipeline Stages (MIPS) architecture processor, or another type of processor). A memory 320, such as a Random Access Memory (RAM), a Flash memory, or other type of memory, is typically accessible to the processor. The memory 320 may be adapted to store an operating system (OS) 330, as well as application programs 340, such as a mobile location enabled application that may provide LBSs to a user. The processor 310 may be coupled, either directly or via appropriate intermediary hardware, to a display 350 and to one or more input/output (I/O) devices 360, such as a keypad, a touch panel sensor, a microphone, and the like. Similarly, in some embodiments, the processor 310 may be coupled to a transceiver 370 that interfaces with an antenna 390. The transceiver 370 may be configured to both transmit and receive cellular network signals, wireless data signals, or other types of signals via the antenna 390, depending on the nature of the mobile device 115. Further, in some configurations, a GPS receiver 380 may also make use of the antenna 390 to receive GPS signals.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., a field programmable gate array (FPGA) or an application-specific integrated circuit (ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 13:
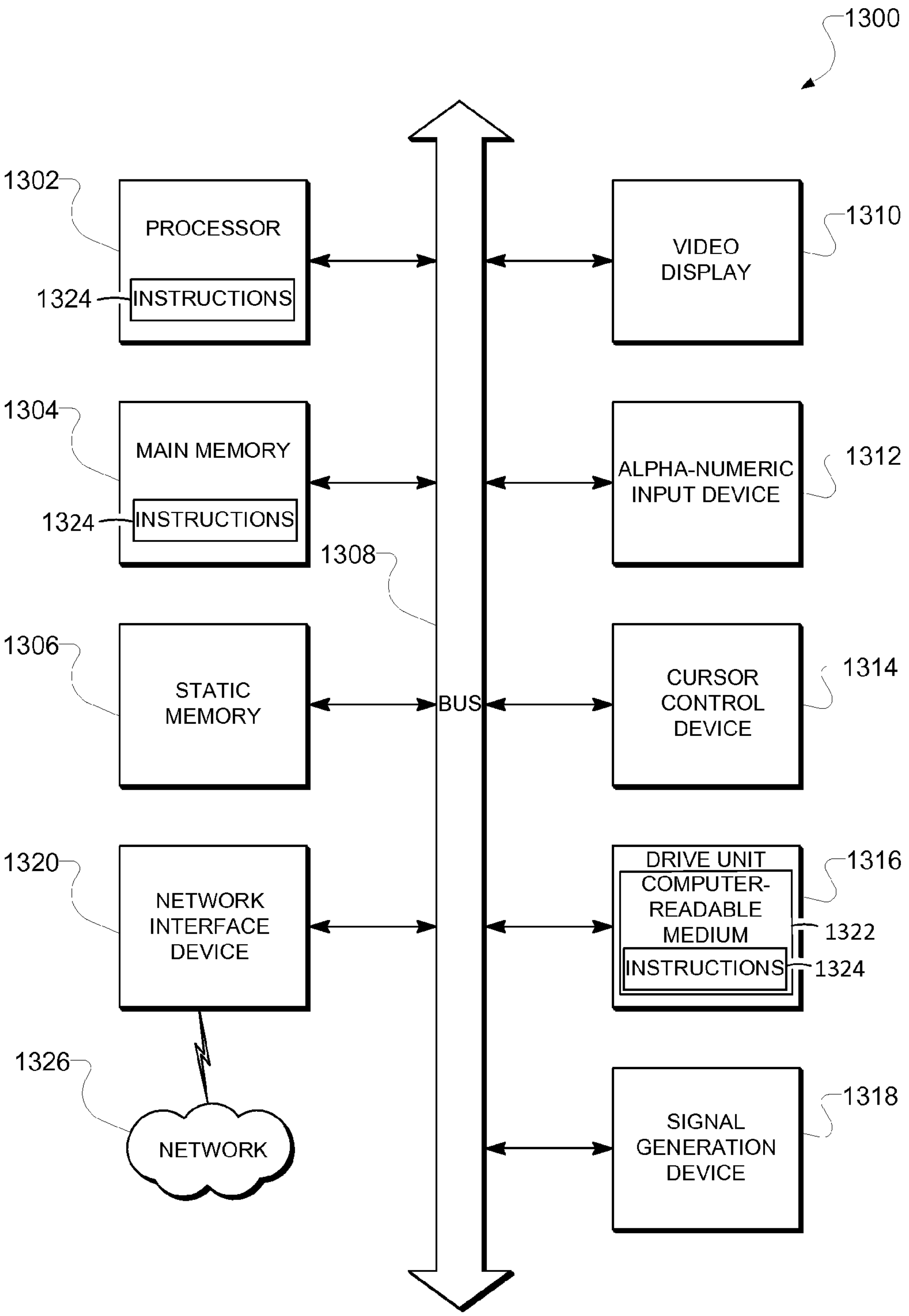
FIG. 13 is a diagrammatic representation of a machine in the example form of a computer system within which a set of instructions, for causing the machine to perform any one or more of the methodologies discussed herein, may be executed.

FIG. 13 is a block diagram of machine in the example form of a computer system 1300 within which instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1300 includes a processor 1302 (e.g., a central processing unit (CPU), a graphics processing unit (GPU) or both), a main memory 1304 and a static memory 1306, which communicate with each other via a bus 1308. The computer system 1300 may further include a video display unit 1310 (e.g., a liquid crystal display (LCD) or a cathode ray tube (CRT)). The computer system 1300 also includes an alphanumeric input device 1312 (e.g., a keyboard or a touch-sensitive display screen), a user interface (UI) navigation device 1314 (e.g., a mouse), a disk drive unit 1316, a signal generation device 1318 (e.g., a speaker) and a network interface device 1320.

Machine-Readable Medium

The disk drive unit 1316 includes a machine-readable medium 1322 on which is stored one or more sets of instructions and data structures (e.g., software) 1324 embodying or utilized by any one or more of the methodologies or functions described herein. The instructions 1324 may also reside, completely or at least partially, within the main memory 1304 and/or within the processor 1302 during execution thereof by the computer system 1300, the main memory 1304 and the processor 1302 also constituting machine-readable media.

While the machine-readable medium 1322 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term “machine-readable medium” shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

Transmission Medium

The instructions 1324 may further be transmitted or received over a communications network 1326 using a transmission medium. The instructions 1324 may be transmitted using the network interface device 1320 and any one of a number of well-known transfer protocols (e.g., HTTP). Examples of communication networks include a local area network (“LAN”), a wide area network (“WAN”), the Internet, mobile telephone networks, Plain Old Telephone (POTS) networks, and wireless data networks (e.g., WiFi and WiMax networks). The term “transmission medium” shall be taken to include any intangible medium that is capable of storing, encoding or carrying instructions for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term “invention” merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A method comprising:

receiving a user query programming request at a mobile device, the user query programming request including a text string that defines one or more words of a user query and a corresponding response phrase to the user query, the mobile device registered to a user;

detecting, using a microphone of the mobile device, an ambient sound signal based on the mobile device entering into an operating mode, the operating mode including at least one of a sleep mode, a hibernate mode, a standby mode, or an inactive mode;

determining that the ambient sound signal includes the one or more words of the user query for assistance in locating the mobile device;

overriding the operating mode in response to the determining the ambient sound signal includes the one or more words of the user query;

emitting, using a speaker of the mobile device, the one or more words of the corresponding response phrase to the user query in response to the determining that the ambient sound signal includes the one or more words of the user query;

detecting, by an accelerometer of the mobile device, a physical contact with the mobile device; and outputting user identification information of the user registered to the mobile device in response to the detecting the physical contact.

2. The method of claim 1, wherein the determining comprises:

accessing query information identifying the user query; and detecting a match between the ambient sound signal and the user query.

3. The method of claim 2, wherein the query information identifies the response phrase corresponding to the user query.

4. The method of claim 1, further comprising:

receiving a user request to store a new user query and a new response sound corresponding to the new user query, receiving a user specification of the new user query;

receiving a user specification of the new response sound; and storing, in query information, the new user query in association with the new response sound.

5. The method of claim 1, further comprising:

identifying a speaker that is a source of the user query; and determining that the speaker is an authorized user of the mobile device.

6. The method of claim 1, further comprising:

detecting a second mobile device located within a predetermined distance of the mobile device;

determining that the user query originated from an operator of the second mobile device; and determining that the operator of the second mobile device is an authorized user of the mobile device.

7. An apparatus comprising:

an interface to receive a user query programming request at a mobile device, the user query programming request including a text string that defines one or more words of a user query and a corresponding response phrase to the user query, the mobile device registered to a user;

a microphone configured to detect an ambient sound signal based on the mobile device entering into an operating mode, the operating mode including at least one of a sleep mode, a hibernate mode, a standby mode, or an inactive mode;

a determination module configured to determine that the ambient sound signal includes the one or more words of the user query for assistance in locating a mobile device, and to override the operating mode in response to the determining the ambient sound signal includes the one or more words of the user query;

a speaker module configured to emit the one or more words of the corresponding response phrase to the user query in response to the determination module determining that the ambient sound signal includes the one or more words of the user query;

an accelerometer configured to detect a physical contact with the mobile device, and an output device to output user identification information of the user registered to the mobile device in response to the physical contact.

8. The apparatus of claim 7, wherein the determination module is further configured to:

access query information identifying the user query; and detect a match between the ambient sound signal and the user query.

9. The apparatus of claim 8, wherein the query information identifies the response phrase corresponding to the user query.

10. The apparatus of claim 7; wherein the determination module is further configured to:

receive a user request to store a new user query and a new response sound corresponding to the new user query;

receive a user specification of the new user query;

receive a user specification of the new response sound; and store, in query information; the new user query in association with the new response sound.

11. The apparatus of claim 7, wherein the determination module is further configured to:

identify a speaker that is a source of the user query; and determine that the speaker is an authorized user of the mobile device.

12. The apparatus of claim 7; wherein the determination module is fiirther configured to:

detect a second mobile device located within a predetermined distance of the mobile device;

determine that the predefined user query originated from an operator of the second mobile device; and determine that the operator of the second mobile device is an authorized user on the of the mobile device.

13. A non-transitory machine-readable storage medium having embodied thereon instructions that, when executed by one or more processors of a machine, cause the machine to perform operations comprising:

receiving a user query programming request at a mobile device, the user query programming request including a text string that defines one or more words of a user query and a corresponding response phrase to the user query, the mobile device registered to a user;

detecting, using a microphone of the mobile device, an ambient sound signal based on the mobile device entering into an operating mode, the operating mode including at least one of a sleep mode, a hibernate mode, a standby mode, or an inactive mode;

determining that the ambient sound signal includes the one or more words of the user query for assistance in locating the mobile device;

overriding the operating mode in response to the determining the ambient sound signal includes the one or more words of the user query;

emitting, using a speaker of the mobile device, the one or more words of the corresponding response phrase to the user query in response to the determining that the ambient sound signal includes the one or more words of the user query;

detecting, by an accelerometer of the mobile device, a physical contact with the mobile device; and outputting user identification information of the user registered to the mobile device in response to the detecting the physical contact.

14. The storage medium of claim 13; wherein the determining comprises:

accessing query information identifying the user query; and detecting a match between the ambient sound signal and the user query.

15. The storage medium of claim 13, wherein the operations further comprise:

receiving a user request to store a new user query and a new response sound corresponding to the new user query;

receiving a user specification of the new user query;

receiving a user specification of the new response sound; and storing, in query information, the new user query in association with the new response sound.

16. The storage medium of claim 13, wherein the operations further comprise:

identifying a speaker that is a source of the user query; and determining that the speaker is an authorized user of the mobile device.

17. The storage medium of claim 13, wherein the operations further comprise:

detecting a second mobile device located within a predetermined distance of the mobile device;

determining that the user query originated from an operator of the second mobile device; and determining that the operator of the second mobile device is an authorized user of the mobile device.

* * * * *